United States Patent [19]
Zappia

[11] 3,857,690
[45] Dec. 31, 1974

[54] HEATED CONVEYOR

[75] Inventor: Anthony T. Zappia, Indianapolis, Ind.

[73] Assignee: Ball Brothers Service Corporation, Muncie, Ind.

[22] Filed: Oct. 9, 1973

[21] Appl. No.: 404,507

[52] U.S. Cl.............. 65/274, 65/120, 65/355, 432/230, 432/231
[51] Int. Cl............................................. C03b 29/04
[58] Field of Search............. 65/120, 271, 274, 355, 65/356; 432/230, 231

[56] References Cited
UNITED STATES PATENTS

| | | | |
|---|---|---|---|
| 1,903,878 | 4/1933 | Powers | 432/230 X |
| 2,064,682 | 12/1936 | Nickerson | 432/230 X |

*Primary Examiner*—Arthur D. Kellogg
*Attorney, Agent, or Firm*—William R. Coffey

[57] ABSTRACT

A conveyor comprising a trackway including a pair of parallel, hollow rails, each presenting a horizontal surface and a vertical surface, the horizontal surfaces being disposed in a common plane and the vertical surfaces facing each other, an endless belt of the grid type having an upper run bridging and supported to travel on the horizontal rail surfaces and having depending elements, at intervals in its length, disposed between and guided by the facing rail surfaces, the interiors of the rails being blocked, at intervals in their lengths, to define longitudinally adjacent sections, valve-controlled conduits for supplying gaseous fluid to the interiors of the individual sections, and mechanism to drive the belt, each rail section being provided with one or more ports for directing such fluid through the grid of the belt. In some cases, the fluid is a combustible substance which ignites only after it has passed through the belt to bathe glassware supported upon the belt in flames. In other instances the fluid may be atmospheric or chilled or heated air. In a preferred embodiment, the belt may be flexible not only about transverse axes but also about perpendicular axes, in which case the trackway may include curves.

8 Claims, 4 Drawing Figures

HEATED CONVEYOR

The object of the present invention is to provide heated conveyor means for conducting articles from one point to another. The conveyor has been designed primarily for transporting newlymade glassware from the forming machine to a lehr, and it will be described in that context, although it will be apparent that the novel features of the present conveyor may find significant utility in other environments.

Preferably, the conveyor may be generally of the modular construction disclosed in my co-pending application Ser. No. 375,653 filed July 2, 1973, although it will be apparent that some of the advances disclosed herein may be utilized in more conventional constructions.

Another object of the invention is to provide a conveyor in which an endless, traveling member is a belt of the grid type, composed of many slightly separated links arranged in transverse rows and longitudinal columns, with gas jets being forced through the grid to be ignited only above the grid, thereby to bathe the ware carried on the conveyor in flames. Still another object of the invention is to support the active run of such a conveyor belt upon longitudinally-extending hollow rails through which combustible fluid may flow, each rail being formed with a multiplicity of ports for ejecting a gaseous fuel from beneath said active run and through the grid throughout the length of the active run of the conveyor belt. Another object is to divide the interiors of the hollow rails into individual sections, by means of blocker means, and to establish valve-controlled conduit means for individually controlling the flow of fuel to such individual sections.

Still a further object of the invention is to provide, in such a system, not only a fuel supply line but also one or more further lines for controllably supplying atmospheric, heated or chilled air selectively to the individual sections of said rails.

Still another object of the invention is to form such rails to provide substantially horizontal upper surfaces for supporting laterally-opposite portions of the belt and to form said rails to provide, also, substantially perpendicular surfaces facing each other whereby members dependent from the belt will be positioned to engage such facing surfaces for laterally guiding at least the active run of the belt. In a preferred form, the belt is of a known construction whereby it is flexible not only about transverse axes but also about axes perpendicular to the supporting surface of the active run whereby said belt can negotiate lateral curves in its travel path.

Still further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described, so long as the scope of the appended claims is not violated.

Figure 1:
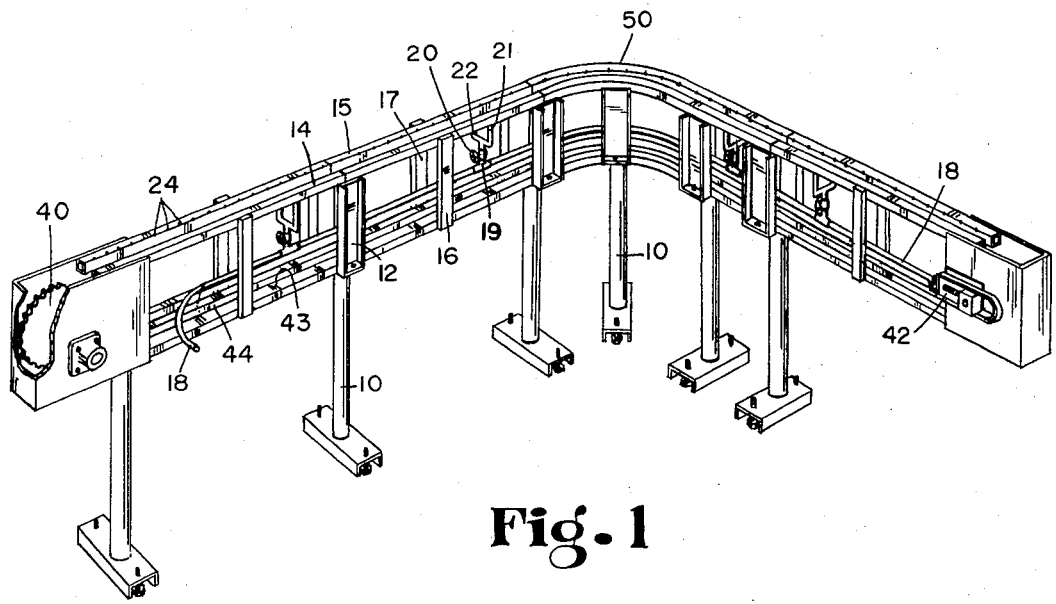
FIG. 1 is a perspective view of a conveyor constructed in accordance with the present invention, the traveling belt being removed for clarity of illustration.
Figure 2:
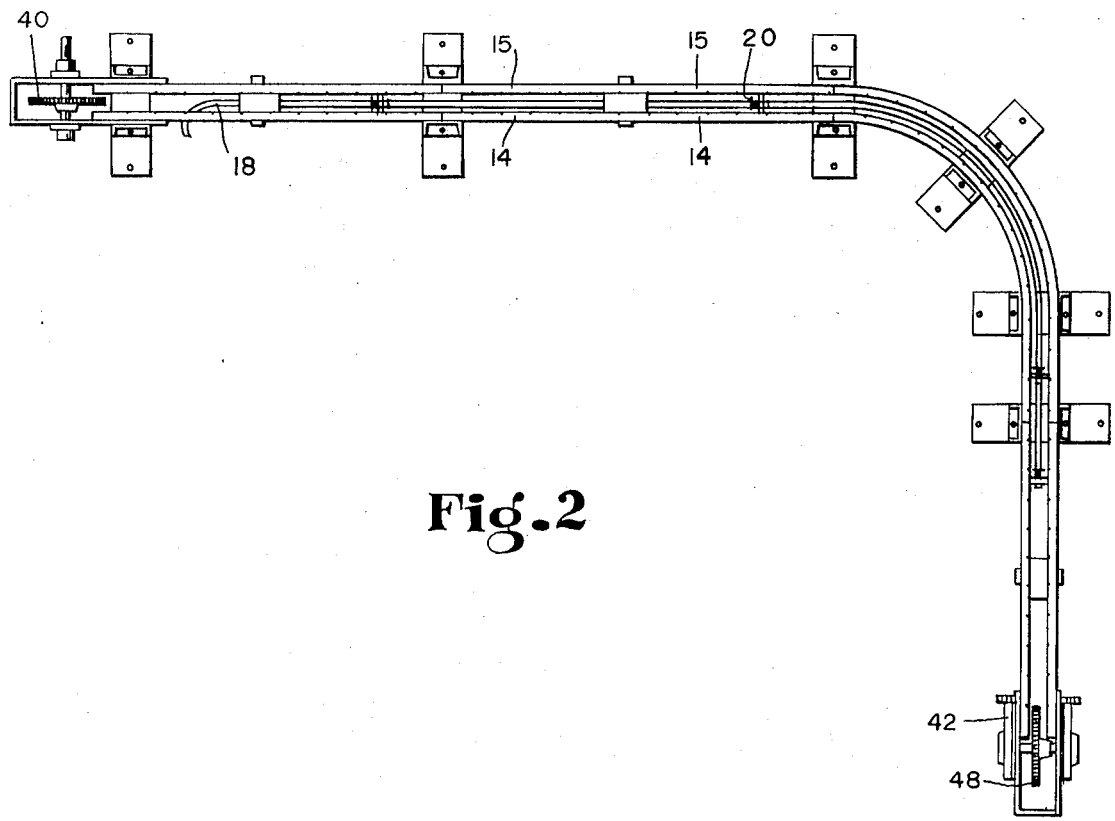
FIG. 2 is a plan view of the same.

Referring more particularly to the drawings, it will be seen that I have illustrated a conveyor of modular form, each module comprising a stanchion 10 provided with a cap 11 supporting front and rear uprights 12 and 13. Rails 14 and 15 are supported from the uprights, each rail being hollow from end to end and the two rails being mounted in parallel, laterally spaced relation to define, with the similar rails of additional modules, a continuing trackway. Front and rear braces 16 and 17 may be arranged between the cap 11 and the rails 14 and 15 at spaced intervals from the stanchions 10.

A supply conduit 18 leading from, for instance, a source of fuel gas extends throughout the length of the conveyor being provided, at intervals in its length, with offtakes 19 each of which is provided with valve means 20 upstream from branches 21 and 22 which lead, respectively, to the interiors of the rails 14 and 15. Each rail section is provided, along its length, with a multiplicity of small jet ports 23 or 24 suitably arranged to direct fluid from the interior of a rail toward the bottom surface of the active run of a continuous, grid-type belt indicated generally by the reference numeral 25.

In the illustrated embodiment of the invention, the rails 14 and 15 are of rectangular cross section and each rail presents an upwardly facing, horizontal flat surface 36 or 37 upon which is supported the active run of the belt 25 as the belt moves through the length of the conveyor. The rail 14 presents, as well, a vertical surface 38 facing, but laterally spaced from, a vertical surface 39 of the companion rail 15. Depending members 32 and 33 located at intervals in the length of the belt 25 carry, respectively, rollers 34 and 35 guidingly engaging the surfaces 38 and 39. In the illustrated embodiment of the invention, the ports 23 open through the corner between the surfaces 36 and 38 while the ports 24 open through the corner between the surfaces 37 and 39.

Figure 4:
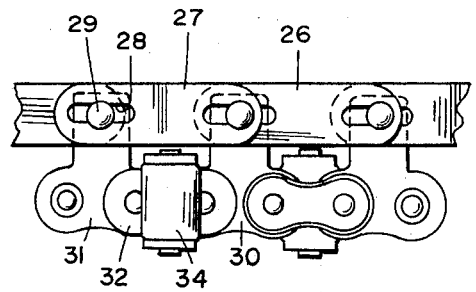
FIG. 4 is a fragmental, further enlarged side elevation of a fragment of the optimum form of belt for use in the invention.

The optimum belt for use in the disclosed conveyor is available on the market from Link Belt of Indianapolis, Indiana, the Chain and Conveyor Components Division of FMC Corporation and is known as Curved Chain-Belt. It consists of transverse series of relatively long links such as 26 and 27 of FIG. 4, formed with longitudinal slots 28 through which extend pins 29 which connect also transverse series of shorter links 30 and 31 which carry the depending members 32 and 33 on which, in turn, are supported the rollers 34 and 35. Because of this construction, the belt is flexible not only about transverse axes but also about axes perpendicular to the carrying surface of the belt, whereby such a belt can and will negotiate curves in a trackway such as that indicated at 50.

The spacing between rollers 34 and 35 is maintained by spacers 41 which, in turn, may be drivingly engaged by the teeth of sprockets 40 and 48 mounted at opposite ends of the conveyor, at least one of said sprockets being driven. The sprocket 48 may be mounted upon adjustable carriers 42 for suitably tensioning the belt.

Supported by the caps 11 may be a continuous floor 43 upon which the return run of the belt may be supported. The rollers 34 and 35 of the members 32 and 33 are received, during the return run, between the vertical surfaces 46 and 47 of rails 44 and 45. The rails 44 and 45 may be identical with the rails 14 and 15, or they may be solid pieces. In some instances, it is found that rails 44 and 45 may be dispensed with except at the inner sides of curves in the trackway.

Figure 3:
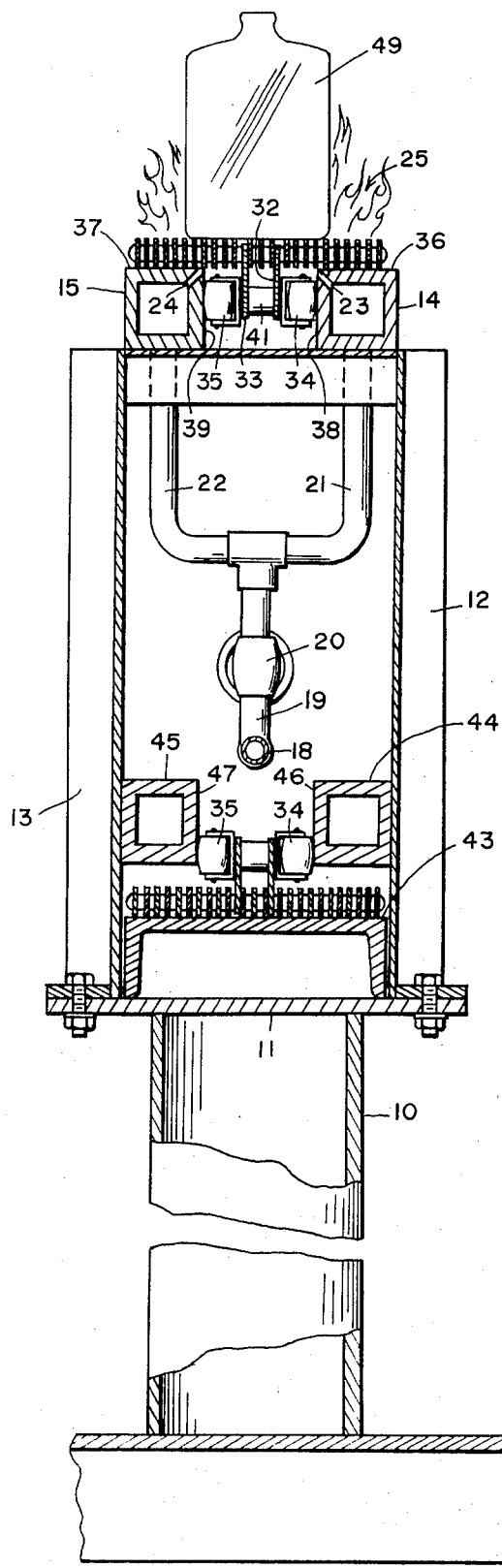
FIG. 3 is a transverse section upon an enlarged scale.

In use, articles such as glassware suggested at 49 in FIG. 3 will be loaded on the belt at one end of its active run and will be carried to the opposite end thereof or to such point in the length of that run at which there may be located an off-bearing gate. Because the illustrated structure lends itself to the establishment of flame above the load-bearing surface of the active run of the belt, it is found that the temperature of the ware being transported can be maintained or elevated with an expenditure of fuel which is 30 to 50% less than that which would be required to accomplish the same results with conventional ovens or radiant heating.

Further, as has been suggested, the use of hollow rails 14 and 15 with their respective jet ports 23 and 24 and valve-controlled supply of selective fluids to the individual sections of said hollow rails permits the operator to bathe the ware on the active run of the conveyor in flame, in heated air, in an envelope of atmospheric air or in chilled air, depending upon what results are desired.

It is particularly to be noted that it is possible, by adjusting the mixture of air with a combustible gas in the track sections, to produce a smoky flame which will result in the deposition of carbon quite uniformly over the surfaces of the individual links and pivots of the chain belt for lubricating the active parts of the belt.

I claim as my invention:

1. A conveyor comprising a trackway including parallel, hollow rails, means for supplying a gaseous fluid to the interior of said rails, an endless belt guided by said rails for travel therealong, cooperative engaging means for guiding said belt against lateral movement relative to said rails, and means for driving said belt, each of said rails being provided with port means for directing a stream of such fluid through said belt, said belt having openings therein through which such fluid passes.

2. The conveyor of claim 1 in which said fluid is a combustible substance which is ignited only after it has passed through said belt to bathe articles supported on said belt in flame.

3. The conveyor of claim 1 in which the interior of each rail is blocked at intervals to divide each rail into adjacent but separated sections, and in which the means for supplying fluid includes a separate conduit for each such section.

4. The conveyor of claim 3 including separate valving means dominating each such separate conduit.

5. The conveyor of claim 1 in which each such rail is formed to provide an upwardly facing surface and another surface facing the other rail, said belt being supported on said upwardly facing surfaces, and said engaging means including, at intervals in said belt length, depending elements guidingly engaging said mutually facing surfaces.

6. The conveyor of claim 1 in which each such rail is formed to provide a substantially horizontal surface and a depending surface, said depending surfaces facing each other, said belt being supported on said horizontal surfaces, and said engaging means including, at intervals in the belt length, depending elements guidingly engaging said depending surfaces.

7. The conveyor of claim 1 in which said belt is flexible about transverse axes and about perpendicular axes.

8. The conveyor of claim 3 including a plurality of sources for separate fluids and in which the means for supplying fluid includes separate, valve-controlled conduit means from each source to each section.

* * * * *